Nov. 30, 1965  S. E. BEYER  3,220,259
THAW INDICATOR

Filed Jan. 25, 1961  3 Sheets-Sheet 1

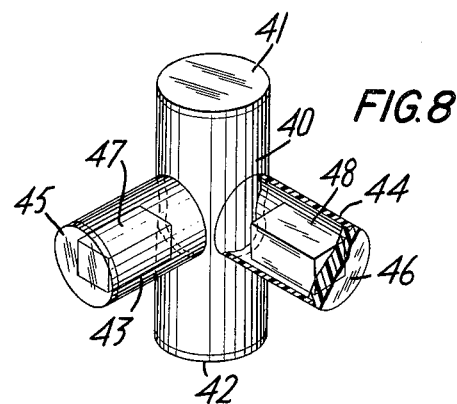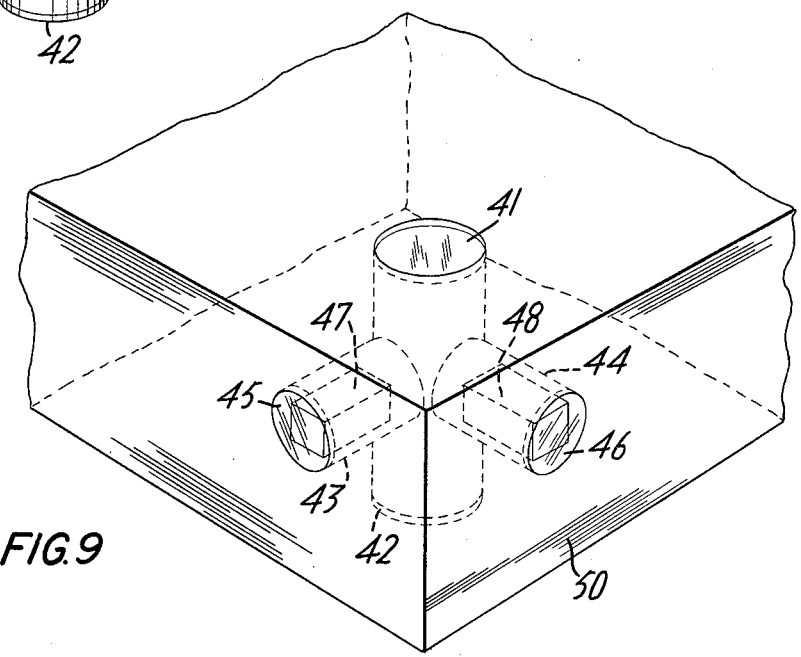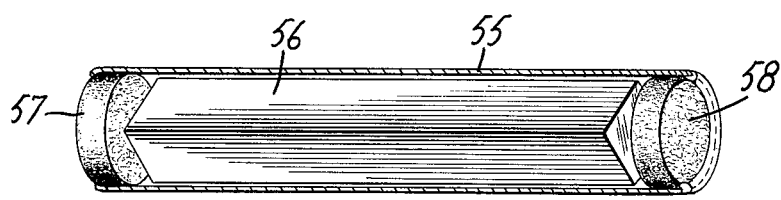

Nov. 30, 1965  S. E. BEYER  3,220,259
THAW INDICATOR
Filed Jan. 25, 1961  3 Sheets-Sheet 3

United States Patent Office 3,220,259
Patented Nov. 30, 1965

1

3,220,259
THAW INDICATOR
Stuart E. Beyer, 54 Easton St., Lowville, N.Y.
Filed Jan. 25, 1961, Ser. No. 84,825
15 Claims. (Cl. 73—358)

This invention relates to a method and means for indicting the quality, spoilage, or possible deterioration of food commodities, biological products and non-biological products that deteriorate under the influence of time and warmth. The invention relates more particularly to a method and means to construct and use a tell-tale indicator which visually shows whether or not a frozen product has been warmed to a temperature and for a sufficient length of time at any time which may cause quality deterioration to an undesirable or even dangerous point of spoilage and any undesired change.

Freezing does not prevent all of the physical and chemical changes which cause quick-frozen food and other cold-stored products to deteriorate. Some deterioration continues even when frozen food is held at a temperature of substantially zero degrees Fahrenheit. However, under normal conditions of turnover of commercial stocks frozen products, for example frozen foods, stored continuously at zero degrees Faherenheit or below reach the consumer in excellent condition. As the temperature rises above zero degrees Fahrenheit deterioration is speeded and the early effects of deterioration on food products are solely on the food's taste and quality. The deterioration process must continue for some time before the food or product becomes dangerious to the consumers health.

However, the frozen food industry and industries concerned with other types of frozen products, for example the chemical and drug industry are concerned with quality control of many food commodities and drug products aside from the deterioration of frozen products to a dangerous level. It has been found that quality change does not result solely from higher product temperatures but more importantly from length of time of exposure in relation to temperature. Spoilage indicating systems have been developed that indicate putrefaction and dangerous deterioration but these systems are not indicators of deterioration of quality only since the system indicates the product is useless and spoilage has taken place.

It is a principal object of the present invention to provide a visual thaw indicator for indicating when frozen food commodities or other frozen products have been thawed for any period of time and continued in this condition or have been refrozen so that at least quality of the commodity or product may have been impaired.

A feature of the thaw indicator according to the invention is the provision in the indicator for visually indicating, at least roughly, the number of times that the product on which the indicator is used has reached a thawing temperature and substantially indicating in some measure the period of time that this condition existed, thereby to indicate the possibility of product deterioration and more particularly deterioration of quality.

Another feature of the thaw indicator for frozen and cold-stored foods and products is its possible construction or use directly on the product or alternatively in conjunction with a package in which the frozen or cold-stored product is contained.

Other features and advantages of the thaw indicator in accordance with the present invention will be better understood as described in the following specification and appended claims, in conjunction with the following drawings, in which:

FIG. 1 is a perspective view of a thaw indicator according to the invention;

2

FIG. 8 is a perspective view of still another embodiment of a thaw indicator according to the invention;

FIG. 9 is a fragmentary perspective view illustrating the use of the indicator in FIG. 8 in a packaged product;

FIG. 10 is a sectional view of a thaw indicator for indicating once that thawing has taken place;

Figure 1:
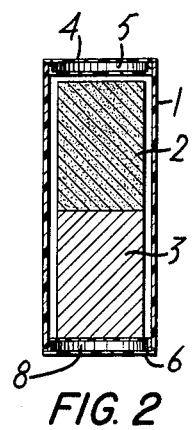
Figure 5:
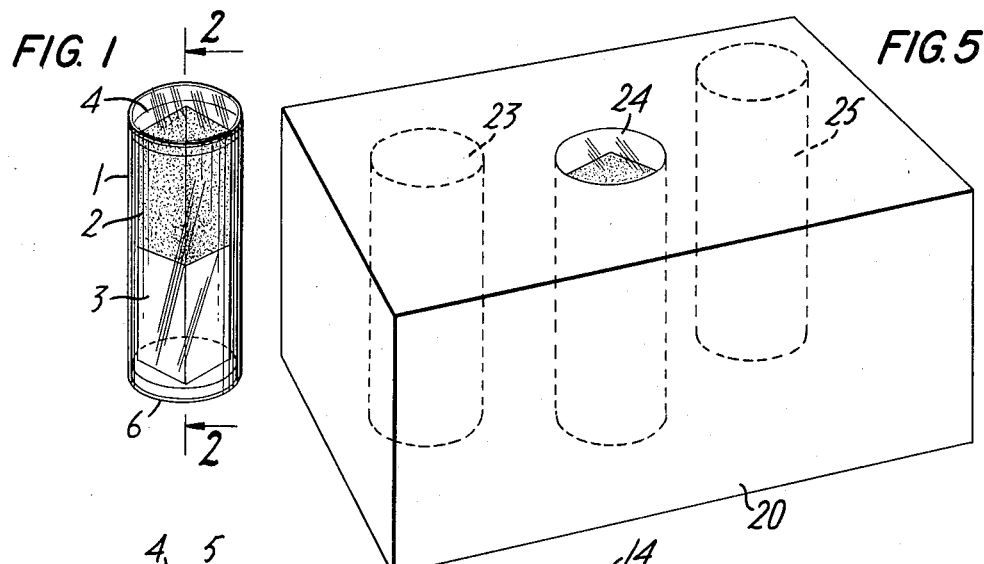
FIG. 5 is a perspective view of a frozen product or commodity illustrating the manner in which the thaw indicators according to the invention are positioned on a packaged frozen product.

Referring now to the drawings and more particularly FIGS. 1-7 the thaw indicator according to the invention comprises a tube or tubular enclosure 1 made of a heat conductive, water-impervious material, for example, a paper or plastic material, in which is contained one or more indicating members capable of thawing at a preselected temperature and capable of being refrozen, as for example, one or more pieces of ice. One embodiment of the invention illustrated in FIGS. 1-3 comprises two ice pieces 2, 3, made from water and as hereafter described, disposed internally of the tubular enclosure 1 and fitting substantially loosely in the container 1. The container or tube 1 is provided with an end cap 4 forming a clear window and provided with an insulating space 5. In a similar manner the opposite end of the tube 1 is sealed off with a bottom cap member 6 also provided with an insulating space 8.

The two ice chunks or pieces 2, 3 have a distinctive geometrical configuration, for example a rectangular shape, and fit loosely within the interior of the container 1. The drawings are exaggerated to show the clearance between the ice pieces and the inner walls of the container 1 to show the loose fit. It being understood that the pieces of ice 2, 3 should not be so loose in the interior of the tube that a relatively effective insulating air barrier exists between the ice and the tube.

The loose condition of the pieces of ice is indicative of a non-thawed condition. If thawing takes place it is readly apparent that the looseness of the ice in the tube 1 is increased and if the product on which the indicator is employed is refrozen the ice pieces will be frozen in a condition in which they are in contact with the walls of the container in the manner shown in FIG. 3, and are not loosely held in the tube. Even slight thawing that would not destroy the configuration of the ice pieces will result in the pieces, upon refreezing, being frozen into a solid condition and fused together in a solid chunk that is wedged solidly in the interior of the container 1 clearly indicating that the indicator and the product with which it is associated, as later herein explained, have been subject to a sufficiently elevated temperature to melt the ice chunks and for a sufficiently long enough period of time to melt the ice pieces somewhat and then refreezing has taken place.

Preferably the size and shape of the ice pieces 2, 3 are to be chosen for quickly denoting a change in shape so that a change in shape will quickly indicate thawing. The ice cubes are preferably colored, in two different colors, with a water soluble food dye, for example the vegetable food dyes which are not dangerous to the product nor to human consumption. The extent of blending of the colors of the ice pieces upon thawing is indicative of the fact that the product was subjected to a thawing temperature for a period sufficiently to bring about the extent of color blending that is noted. The colors tend to form strata indicative of successive thaws and refreezing..

Figures 2, 4:
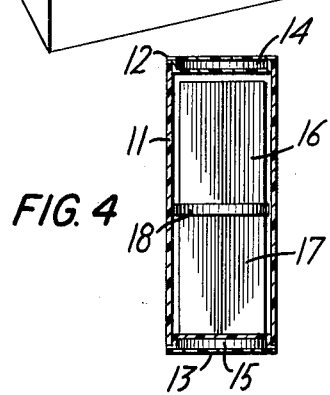
FIG. 2 is a sectional view taken along line 2—2 of FIG. 1.
FIG. 4 is an elevation sectional view illustrating another embodiment of a thaw indicator according to the invention.
Figure 6:
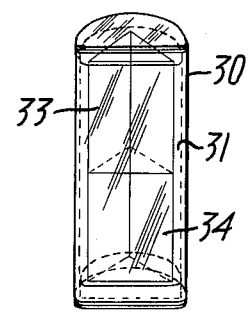
FIG. 6 is a perspective view of a semi-cylindrical thaw indicator according to the invention.
Figure 3:
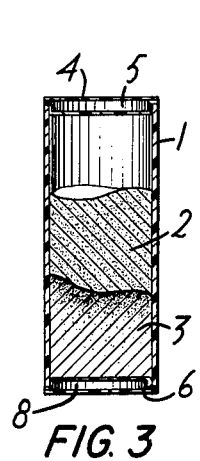
FIG. 3 is an elevation section of the thaw indicator shown in FIGS. 1 and 2, illustrating the manner in which the thaw indicator visually indicates that thawing has taken place.
Figure 7:
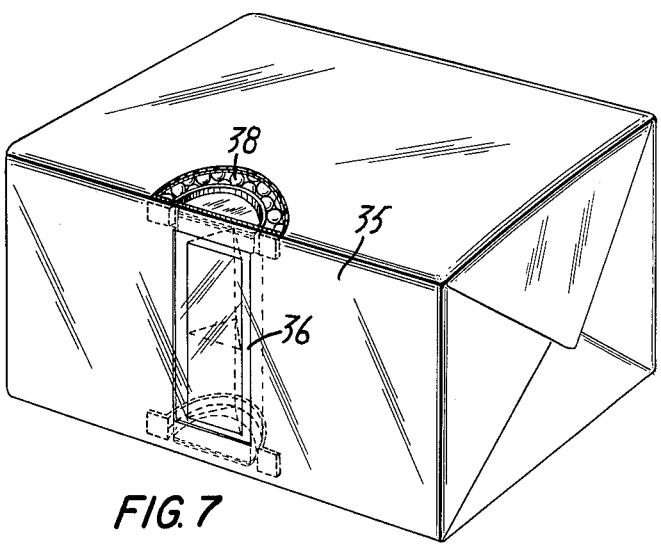
FIG. 7 is a perspective view of a packaged food commodity illustrating the manner in which the thaw indicator shown in FIG. 6 is employed.

Another embodiment of a thaw indicator according to the invention is illustrated in FIG. 4 in which a tube 11 is provided with one or more plugs or caps 12, 13 at least one of which is a clear window as heretofore described, with respective air insulative spaces 14, 15. The thaw indicator in this instance is provided with two ice pieces 16, 17 internally of the tube 11 in the manner heretofore described. The two ice pieces are spaced apart by an absorbent wafer 18. The wafer 18 fits snugly in the tube dividing the tube into two separate compartments in which the ice pieces 16, 17 are housed respectively.

The wafer 18 is capable of indicating if the ice pieces have ever been in an aqueous condition after the cubes were initially frozen. For this purpose the wafer is made of an absorbent material, for example compacted and bonded common sugar or salt or a like material, that is not injurious to the product for which the container is to be used and not injurious to human consumption. The indicator wafer, by absorbing the coloring matter of either of the ice pieces, when in an aqueous condition, will visually indicate the extent of thawing since the intensity of the colors absorbed from the ice pieces will be indicative of prolonged thawing. It being understood that the wafer 18 is of sufficient thickness to allow a sufficient penetration of the dye material from the ice pieces and absorption thereof to indicate by virtue of the depth of the penetration of the coloring materials and the hue or intensity of the colors.

The thaw indicators described according to the invention are used in conjunction with packaged frozen products or food commodities, for example in a package 20. Preferably a package containing a frozen product has a plurality of thaw indicators 23, 24, 25 of the above-described type in which either one of the windows thereon or both are disposed for viewing through the material of package 20 or transparent portions in registry with the windows of the thaw indicators visually indicating the condition of the various portions of the product contained in the package. In this manner the temperature condition can be sensed throughout the entire product and more particularly the interior of the product is sensed not merely surface heat on the package as is sensed by known indicators.

Another embodiment of a thaw indicator according to the invention provides for viewing of the entire indicator through a window therein when in position in a package with the product that it is used on. The indicator comprises a semi-cylindrical tube 30 constructed in a manner of the tubes heretofore described and having a clear window 31 for viewing within the indicator two pieces of ice 33, 34 disposed in axial relationship internally of the tube and preferably colored. The indicator is positioned in a package 35 adjacent a side of the package in which is provided a package window 36 for viewing the indicator internally of the package. The package may contain a quick-frozen product, for example frozen peas 38, or a product that is simply to be cold-stored. The indicator functions in the manner heretofore described with respect to the other indicators. It is readily apparent that the indicator constructed in this manner can be provided with an absorbent wafer indicator in the manner of the indicator described with respect to FIGS. 4 and 5.

As heretofore described one or a plurality of thaw indicators can be used to sense the product. Alternatively, a single thaw indicator can sense various sections of a packaged product by use of a construction illustrated in FIGS. 8 and 9 as an example of such an indicator. The thaw indicator comprises a central tube 40 having end caps 41, 42 at least one of which is a window for viewing ice pieces, not shown, internally of the tube 40. This construction is similar to the indicator in FIG. 1. A plurality of sensing arms extend radially from the central tube in the form of tubes 43, 44 for sensing different portions of the product.

The tubes forming the two arms are provided with respective windows 45, 46 for viewing of ice pieces 47, 48 within each respective arm. These ice pieces function as heretofore described. The indicator is mounted in a package 50 adjacent a corner thereof so that any one of the indicators can be read and only one need be viewable. It is readily apparent that the central tube need not contain one or more pieces of ice and can be constructed without ice to allow flow of liquid into it from the two arms 43, 44, in the event their ice pieces thaw and the liquid content and color provides the indicator or "read out" medium.

Moreover, it is readily apparent to those skilled in the art that the last-described indicator can have more radially extending arms and these arms, not shown, can be made of predetermined lengths for sensing any desired portion of a package containing a product that is to be protected by cold-storing or freezing. It is understood, of course, that the ice pieces within such arms correspond in length with their respective arms.

According to the invention a "one shot" type of thaw indicator is provided for indicating that thawing has taken place one and from which permanent damage to the frozen product on which the indicator has been used can be assumed. In this type of construction, FIG. 10, the indicator is provided with a tube 55. A single piece of ice 56 is disposed axially in the container 55. The piece of ice is brightly colored with a harmless food dye as heretofore described. The piece of ice preferably contains an adulterating agent lowering the melting point of the ice.

Two white sugar wafers 57, 58 are disposed, and held by the tube ends, at opposite ends of the piece or plug of ice 56. The device reads out if the white sugar wafers are in any manner discolored. In this construction the thickness of the sugar wafers can be varied as desired. It being understood that suitable bonding agents are added to the sugar.

While the indicators heretofore described have been described as used in conjunction with a packaged frozen product or commodity the invention provides for placing thaw indicators usable on unpackaged products in selected positions thereon and removable from the frozen product for study thereof. Thaw indicators for use directly on a product and embedded therein are constructed, FIGS. 12–15, as removable wedges, for example, in the form of a tapered or conical enclosure 60, made of a clear hard plastic having a sharpened point 61 for penetration into the product in which the indicator is to be embedded. The tapered tubular element 60 is provided with a clear plastic cap 63. Internally of the indicator are disposed a pair of ice chunks or pieces 64, 65 having a specific configuration conforming to the enclosure in the manner heretofore described. The ice pieces 64, 65 fit somewhat loosely in the wedge-shaped plastic body 60 in the manner heretofore described and are shown with an exaggerated clearance between the ice pieces and the internal surfaces of the indicator. The ice pieces are preferably colored and function in the manner described with respect to the other indicators.

Thaw indicators thus made of a hard plastic are embedded directly on the frozen product or food commodity on which they are to act as tell-tale indicators. For example, the indicators constructed in this manner are disposed at various points of a beef carcass 68 or on a roast 69. Preferably a plurality of indicators are disposed over various portions of the product in the manner shown in FIG. 14.

The indicators can be viewed through the respective windows 63, and are read in position or alternatively removed from the product for detailed study thereof.

Figure 11:
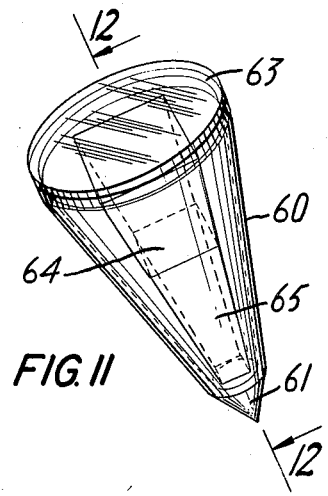
FIG. 11 is a perspective view of a conical or wedge-shaped thaw indicator for use directly on frozen products and commodities.
Figure 12:
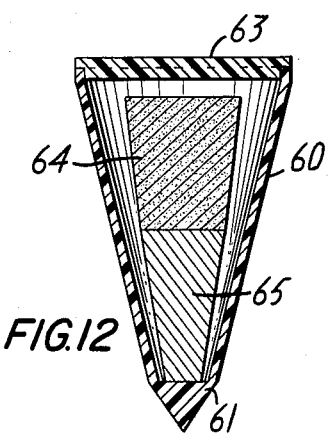
FIG. 12 is a sectional view taken along line 12—12 of FIG. 11.
Figure 13:
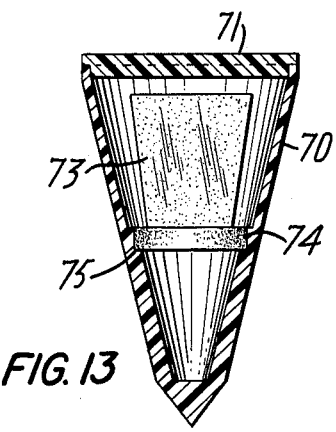
FIG. 13 is an elevation sectional view of another embodiment of a thaw indicator of the type shown in FIG. 11.
Figure 14:
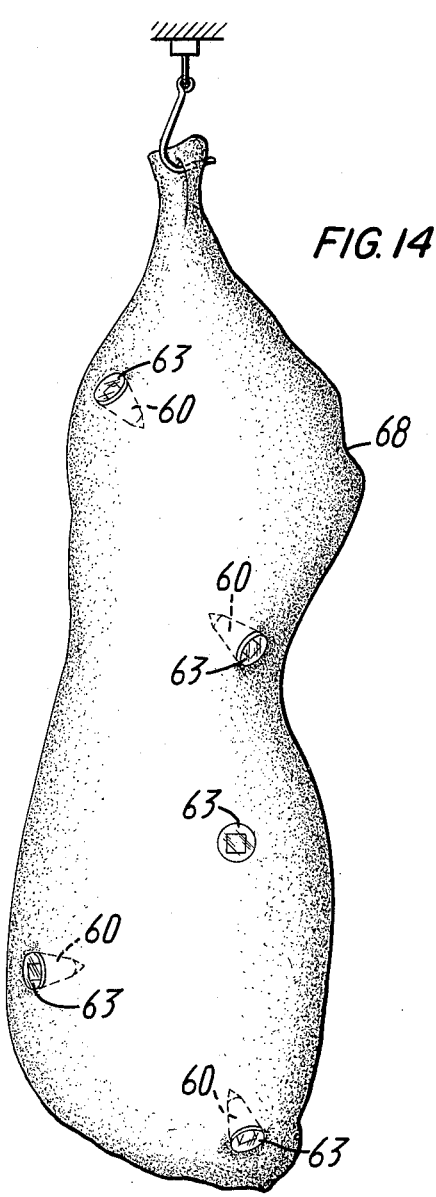
FIGS. 14 and 15 are perspective views of frozen or cold-stored products illustrating the manner in which the thaw indicators of FIGS. 11-13 are used.
Figure 15:
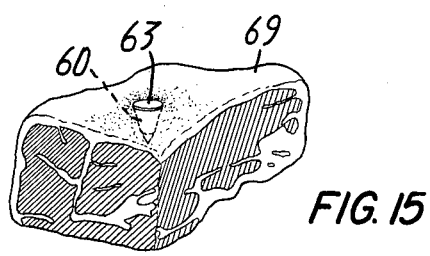

An alternative construction to the wedge-shaped indicator heretofore described is illustrated in FIG. 13 in which an enclosure 70 made in a conical or wedge-shaped configuration of a solid clear plastic material is provided with the end cap 71, also made of a clear plastic. Internally of the device is disposed a colored ice piece 73. The ice 73 has a specific geometrical configuration and fits internally of the enclosure 70 as heretofore described with respect to the ice cubes, the embodiment shown in FIG. 11. In this construction the ice rests on an indicator wafer 74 made of an absorbent material, for example sugar or salt, and fixed axially in the enclosure 70 on an annular shoulder 75. The indicator functions in the manner described heretofore with respect to the embodiment shown in FIG. 4. This type of indicator is disposed directly on the product as shown and described heretofore with respect to FIGS. 14 and 15. It is readily apparent that two colored ice pieces can be used in this device as well as the single piece.

It is readily apparent to those skilled in the art that the point at which the pieces of ice melt can be set over a wide range by addition of an agent, for example salt or sugar, so that a product damaged by a minor change above zero degrees Fahrenheit is sensed by having the ice thaw or melt at a point close to zero and less than 32° Fahrenheit. It is apparent indicators thus made can have preset ranges in accordance with the quality deterioration characteristics of the product with which the indicator is employed. It is, of course, understood that control or adulterating agent added to the water to determine the range can be used in any of the embodiments of the invention and must not be harmful to humans and to the product.

The thaw indicator types according to the invention are usable in packaged products which are hermetically sealed and on unpackaged products. The indicators according to the invention provide a simple tell-tale device highly effective to indicate visually by indicator mediums therein, which function to indicate either by being in an aqueous liquid state, by change of shape, by the manner in which they fit into the device, by color intensity, color blending, color absorption and rate and extent of absorption, all of which are indicia of at least the quality of the product on which they are used.

While preferred embodiments of the invention have been shown and described it will be understood that many modifications and changes may be made within the true spirit and scope of the invention.

What I claim and desire to secure by Letters Patent is:

1. A thaw and quality indicator for frozen and cold-stored foods and products comprising, at least one piece of ice having a specific geometric configuration, a liquid-impervious enclosure completely enclosing said piece of ice and having at least a transparent portion for viewing said piece of ice, said piece of ice fitting in said enclosure with a relatively small clearance relative the inner surfaces of said enclosure in a frozen condition, said piece of ice being sufficiently movable in said enclosure in the absence of melting and refreezing thereof as to have movement relative to said inner surfaces of said enclosure detectable at least visually, said clearance between said piece of ice and said inner surfaces being disposed and dimensioned to allow movement between the ice piece and enclosure in the absence of melting of said ice piece and refreezing, and said clearance being dimensioned sufficiently small to cause said piece of ice to remain fixed relatively to said inner surfaces if at least a portion of the piece of ice melts and the melted portion refrozen.

2. A thaw and quality indicator for frozen and cold-stored foods and products comprising, at least one piece of ice having a specific geometric configuration, a coloring substance in said ice piece which is harmless to the frozen product or food and harmless at least to humans if consumed, a liquid-impervious enclosure completely enclosing said piece of ice and having at least a transparent portion for viewing said piece of ice, said piece of ice fitting in said enclosure with a relatively small clearance relative the inner surfaces of said enclosure in a frozen condition, said piece of ice being sufficiently movable in said enclosure in the absence of melting and refreezing thereof as to have movement relative to said inner surfaces of said enclosures detectable at least visually, said clearance between said piece of ice and said inner surfaces being disposed and dimensioned to allow movement between the ice piece and enclosure in the absence of melting of said ice piece and refreezing, and said clearance being sufficiently small to cause said piece of ice to remain fixed relatively to said inner surfaces if at least a portion of the piece of ice melts and the melted portion refrozen.

3. A thaw and quality indicator for frozen and cold-stored foods and products comprising, at least one piece of ice made of frozen water having a specific geometrical configuration, a liquid-impervious enclosure completely enclosing said piece of ice and having at least a transparent portion for viewing said piece of ice, and said piece of ice fitting in said enclosure with a relatively small clearance relative the inner surfaces of said enclosure in a frozen condition, said piece of ice being sufficiently movable in said enclosure in the absence of melting and refreezing thereof as to have movement relative to said inner surfaces of said enclosure detectable at least visually, said clearance between said piece of ice and said inner surfaces being disposed and dimensioned to allow movement between the ice piece and enclosure in the absence of melting of said ice piece and refreezing, and said clearance being dimensioned sufficiently small to cause said piece of ice to remain fixed relatively to said inner surfaces if at least a portion of the piece of ice melts and the melted portion refrozen.

4. A thaw and quality indicator for frozen and cold-stored foods and products comprising, at least one piece of ice made of frozen water having a specific geometrical configuration, a coloring substance in said ice piece which is harmless to the frozen product or food and harmless at least to humans if consumed, a liquid-impervious enclosure completely enclosing said piece of ice and having at least a transparent portion for viewing said piece of ice, said piece of ice fitting in said enclosure with a relatively small clearance relative the inner surfaces of said enclosure in a frozen condition, said piece of ice being sufficiently movable in said enclosure in the absence of melting and refreezing thereof as to have movement relative to said inner surfaces of said enclosure detectable at least visually, said clearance between said piece of ice and said inner surfaces being disposed and dimensioned to allow movement between the ice piece and enclosure in the absence of melting of said piece and refreezing, and said clearance between said piece of ice and said inner surfaces being disposed and dimensioned to allow movement between the ice piece and enclosure in the absence of melting of said ice piece and refreezing, and said clearance being sufficiently small to cause said piece of ice to remain fixed relatively to said inner surfaces if at least a portion of the piece of ice melts and the melted portion refrozen.

5. A thaw and quality indicator for frozen and cold-stored foods and products comprising, pieces of ice each having a specific geometrical configuration, a coloring substance in said ice pieces which is harmless to the frozen product or food and harmless at least to humans if consumed, a liquid-impervious enclosure completely enclosing said pieces of ice and having at least a transparent portion for viewing said pieces of ice, said pieces of ice fitting in said enclosure with a relatively small clearance relative the inner surfaces of said enclosure in a frozen condition, said pieces of ice being sufficiently movable in said enclosure in the absence of melting and refreezing thereof as to have movement relative to said inner surfaces of said enclosure detectable at least visually, said clearance between said pieces of ice and said inner surfaces being disposed and dimensioned to allow movement between the ice pieces and enclosure in the absence of melting of said ice pieces and refreezing, and said clearance being dimensioned sufficiently small to cause said pieces of ice to remain fixed relatively to said inner surfaces if at least a portion of ice melts and the melted portion refrozen.

6. A thaw and quality indicator for frozen and cold-stored foods and products comprising, at least one piece of ice having a specific geometrical configuration, a liquid-impervious conical enclosure completely enclosing said piece of ice and having at least a transparent portion for viewing said piece of ice, said piece of ice fitting in said enclosure with a relatively small clearance relative the inner surfaces of said enclosure in a frozen condition, said piece of ice being sufficiently movable in said enclosure in the absence of melting and refreezing thereof as to have movement relative to said inner surfaces of said enclosure detectable at least visually, said clearance between said piece of ice and said inner surfaces being disposed and dimensioned to allow movement between the ice piece and enclosure in the absence of melting of said ice piece and refreezing, and said clearance being dimensioned sufficiently small to cause said piece of ice to remain fixed relatively to said inner surfaces if at least a portion of the piece of ice melts and the melted portion refrozen.

7. A thaw and quality indicator according to claim 6, in which said piece of ice comprises a coloring substance which is harmless to the frozen product or food and harmless at least to humans if consumed.

8. A thaw and quality indicator according to claim 7, in which said coloring substance is a vegetable dye.

9. A thaw and quality indicator for frozen and cold-stored foods and products comprising, a piece of ice having a specific geometrical configuration, a coloring substance in said ice piece which is harmless to the frozen product or food and harmless at least to humans if consumed, a piece of indicator material disposed adjacent said piece of ice in position for absorbing said coloring substance when at least a part of said piece of ice thaws and is in an aqueous state, and a liquid-impervious enclosure completely enclosing said piece of ice and piece of indicator material said piece of ice fitting in said enclosure with a relative small clearance relative to the inner surfaces of said enclosure in a frozen condition, said enclosure having at least a transparent portion for viewing at least said piece of indicator material, said piece of ice being sufficiently movable in said enclosure in the absence of melting and refreezing thereof as to have movement relative to said inner surfaces of said enclosure detectable at least visually, said clearance between said piece of ice and said inner surfaces being disposed and dimensioned to allow movement between the ice piece and enclosure in the absence of melting of said ice piece and refreezing, and said clearance being dimensioned sufficiently small to cause said piece of ice to remain fixed relatively to said inner surfaces if at least a portion of the piece of ice melts and the melted portion refrozen.

10. A thaw and quality indicator for frozen and cold-stored foods and products comprising, two pieces of ice each having a specific geometrical configuration, a coloring substance in each of said ice pieces which is harmless to the frozen product or food and harmless at least to humans if consumed, a piece of indicator material disposed adjacent and between said pieces of ice in position for absorbing the coloring substances when at least a part of said pieces of ice thaws and is in an aqueous state, and a liquid-impervious enclosure completely enclosing said pieces of ice and piece of indicator material said piece of ice fitting in said enclosure with a relative small clearance relative to the inner surfaces of said enclosure in a frozen condition, said enclosure having at least a transparent portion for viewing at least said piece of indicator material, said piece of ice being sufficiently movable in said enclosure in the absence of melting and refreezing thereof as to have movement relative to said inner surfaces of said enclosure detectable at least visually, said clearance between said piece of ice and said inner surfaces being disposed and dimensioned to allow movement between the ice piece and enclosure in the absence of melting of said ice piece and refreezing, and said clearance being dimensioned sufficiently small to cause said piece of ice to remain fixed relatively to said inner surfaces if at least a portion of the piece of ice melts and the melted portion refrozen.

11. A thaw and quality indicator for frozen and cold-stored foods and products comprising, a piece of ice having a specific geometrical configuration, a coloring substance in said ice piece which is harmless to the frozen product or food and harmless at least to humans if consumed, a piece of indicator material disposed adjacent said piece of ice in position for absorbing said coloring substance when at least a part of said piece of ice thaws and is in an aqueous state, and a liquid-impervious conical enclosure made of a rigid material jointly enclosing said piece of ice and piece of indicator material completely, having said piece of ice fitting in said enclosure with a relative small clearance relative to the inner surfaces of said enclosure in a frozen condition, said enclosure at least a transparent portion for viewing at least said piece of indicator material, said piece of ice being sufficiently movable in said enclosure in the absence of melting and refreezing thereof as to have movement relative to said inner surfaces of said enclosure detectable at least visually, said clearance between said piece of ice and said inner surfaces being disposed and dimensioned to allow movement between the ice piece and enclosure in the absence of melting of said ice piece and refreezing, and said clearance being dimensioned sufficiently small to cause said piece of ice to remain fixed relatively to said inner surfaces if at least a portion of the piece of ice melts and the melted portion refrozen.

12. A thaw and quality indicator for frozen and cold-stored foods and products comprising, a plurality of pieces of ice having a specific geometrical configuration, a coloring substance in each of said ice pieces which is harmless to the frozen product or food and harmless at least to humans if consumed, and a liquid-impervious enclosure completely enclosing said pieces of ice in angularly spaced positions, said pieces of ice fitting in said enclosure with a relative small clearance relative to the inner surfaces of said enclosure in a frozen condition, said enclosure and having at least a transparent portion for viewing said pieces of ice, said pieces of ice being sufficiently movable in said enclosure in the absence of melting and refreezing thereof as to have movement relative to said inner surfaces of said enclosure detectable at least visually, said clearance between said pieces of ice and said inner surfaces being disposed and dimensioned to allow movement between the ice piece and enclosure in the absence of melting of said ice pieces and refreezing, and said clearance of melting of said ice pieces and refreezing, and said clearance being dimensioned sufficiently small to cause said pieces of ice to remain fixed relatively to said inner surfaces if at least a portion of the pieces of ice melts and the melted portion refrozen.

13. In combination with a package a thaw and quality indicator for frozen and cold-stored foods and products comprising, a piece of ice having a specific geometrical configuration, a coloring substance in said ice piece which is harmless to the frozen product or food and harmless at least to humans if consumed, a piece of indicator material disposed adjacent said piece of ice in position for absorbing said coloring substance when at least a part of said piece of ice thaws and is in an aqueous state, a liquid-impervious enclosure jointly enclosing said piece of ice and piece of indicator material completely, said piece of ice fitting in said enclosure with a relative small clearance relative to the inner surfaces of said enclosure in a frozen condition, said enclosure having at least a transparent portion for viewing at least said piece of indicator material, said package having at least a transparent portion in registry with said transparent portion of said enclosure for viewing at least said piece of indicator material said piece of ice being sufficiently movable in said enclosure in the absence of melting and refreezing thereof as to have movement relative to said inner surfaces of said enclosure detectable at least visually, said clearance between said piece of ice and said inner surfaces being disposed and dimensioned to allow movement between the ice piece and enclosure in the absence of melting of said ice piece and refreezing, and said clearance being dimensioned sufficiently small to cause said piece of ice to remain fixed relatively to said inner surfaces if at least a portion of the piece of ice melts and the melted portion refrozen.

14. In combination with a package, a thaw and quality indicator for frozen and cold-stored foods and products comprising, a piece of ice having a specific geometrical configuration, a coloring substance in said ice piece which is harmless to the frozen product or food and harmless at least to humans if consumed, and a liquid-impervious enclosure completely enclosing said piece of ice having at least a transparent portion for viewing at least said piece of ice, said piece of ice fitting in said enclosure with a relative small clearance relative to the inner surfaces of said enclosure in a frozen condition, said enclosure and said package having at least a transparent portion in registry with said transparent portion of said enclosure for viewing at least said piece of ice said piece of ice being sufficiently movable in said enclosure in the absence of melting and refreezing thereof as to have movement relative to said inner surfaces of said enclosure detectable at least visually, said clearance between said piece of ice and said inner surfaces being disposed and dimensioned to allow movement between the ice piece and enclosure in the absence of melting of said ice piece and refreezing, and said clearance being dimensioned sufficiently small to cause said piece of ice to remain fixed relatively to said inner surfaces if at least a portion of the piece of ice melts and the melted portion refrozen.

15. A thaw and quality indicator for frozen and cold-stored foods and products comprising, at least one piece of ice comprising a frozen liquid and having a specific geometrical configuration, a liquid-impervious enclosure completely enclosing said piece of ice and having at least a transparent portion for viewing said piece of ice, said piece of ice fitting in said enclosure with a relatively small clearance relative the inner surfaces of said enclosure in a frozen condition, an adulterating agent in said liquid frozen into said piece to cause the piece of ice to melt at a preselected temperature above zero degrees Fahrenheit and below thirty two degrees Fahrenheit said piece of ice being sufficiently movable in said enclosure in the absence of melting and refreezing thereof as to have movement relative to said inner surfaces of said enclosure detectable at least visually, said clearance between said piece of ice and said inner surfaces being disposed and dimensioned to allow movement between the ice piece and enclosure in the absence of melting of said ice piece and refreezing, and said clearance being dimensioned sufficiently small to cause said piece of ice to remain fixed relatively to said inner surfaces if at least a portion of the piece of ice melts and the melted portion refrozen.

References Cited by the Examiner
UNITED STATES PATENTS

| | | | |
|---|---|---|---|
| 688,562 | 12/1901 | Watkin | 73—358 |
| 2,614,430 | 10/1952 | Ballard et al. | 73—358 |
| 2,662,018 | 12/1953 | Smith | 73—358 |
| 2,762,711 | 9/1956 | Zopf | 99—192 |
| 2,951,764 | 9/1960 | Chase | 99—192 |

ISAAC LISANN, *Primary Examiner.*